United States Patent [19]
Leonard

[11] 3,884,113
[45] May 20, 1975

[54] SLIDE RULE CHORD INDICATOR

[76] Inventor: Verna M. Leonard, 8701 Highway 41, Fresno, Calif. 93710

[22] Filed: July 24, 1974

[21] Appl. No.: 491,256

[52] U.S. Cl. .............................. 84/471; 84/477 R
[51] Int. Cl. ........................................ G09b 15/02
[58] Field of Search ....................... 84/470–474, 84/477 R, 483

[56] References Cited
UNITED STATES PATENTS

| | | | |
|---|---|---|---|
| 367,156 | 7/1887 | Nix | 84/473 |
| 632,137 | 8/1899 | Morriss | 84/473 |
| 3,180,200 | 4/1965 | McDowell | 84/477 R |

Primary Examiner—Stephen J. Tomsky
Assistant Examiner—John F. Gonzales
Attorney, Agent, or Firm—Ralph S. Branscomb

[57] ABSTRACT

The invention is a slide rule chord indicator having an upper dial which is rotatable to display the root tones of the related major and minor chords of any chosen key signature and including sliding panels having indicators thereon which select the particular scale tones of the related chords from named scale tones on a replaceable sheet of staff paper.

4 Claims, 3 Drawing Figures

SLIDE RULE CHORD INDICATOR

BACKGROUND OF THE INVENTION

The invention is related to my co-pending application entitled "Key Signature Structure Teaching Aid." The purpose of that device is to overlay the diatonic scales of the various key signatures on the musical staff and familiarize the student with the manner in which the intervals of the diatonic scale remain constant for all key signatures and by moving the scale up or down on a musical staff all key signatures may appear on the staff. However, that teaching aid was not adapted to select actual chords from the musical staff, or display the related major and minor chords in any key signature.

SUMMARY OF THE INVENTION

The present invention compliments the above-mentioned co-pending application and comprises a backing panel having a dial rotatably mounted thereon, the dial being provided with a peripheral display of the scale tone names arranged in accordance with the cycle of fourths. A cover sheet is disposed over the dial to indicate the related major and minor chords of any particular key signature selected by rotation of the dial. A sheet of staff paper is provided below the dial and has the lines and spaces thereon named according to the scale tones used in the selected key signature, and a pair of vertically slideable panels adjacent the named scale tones have chord indicators thereon which indicate which of the named scale tones are used in the related major and minor chords.

DETAILED DESCRIPTION OF THE PREFERRED EMBODIMENT

Figure 1:
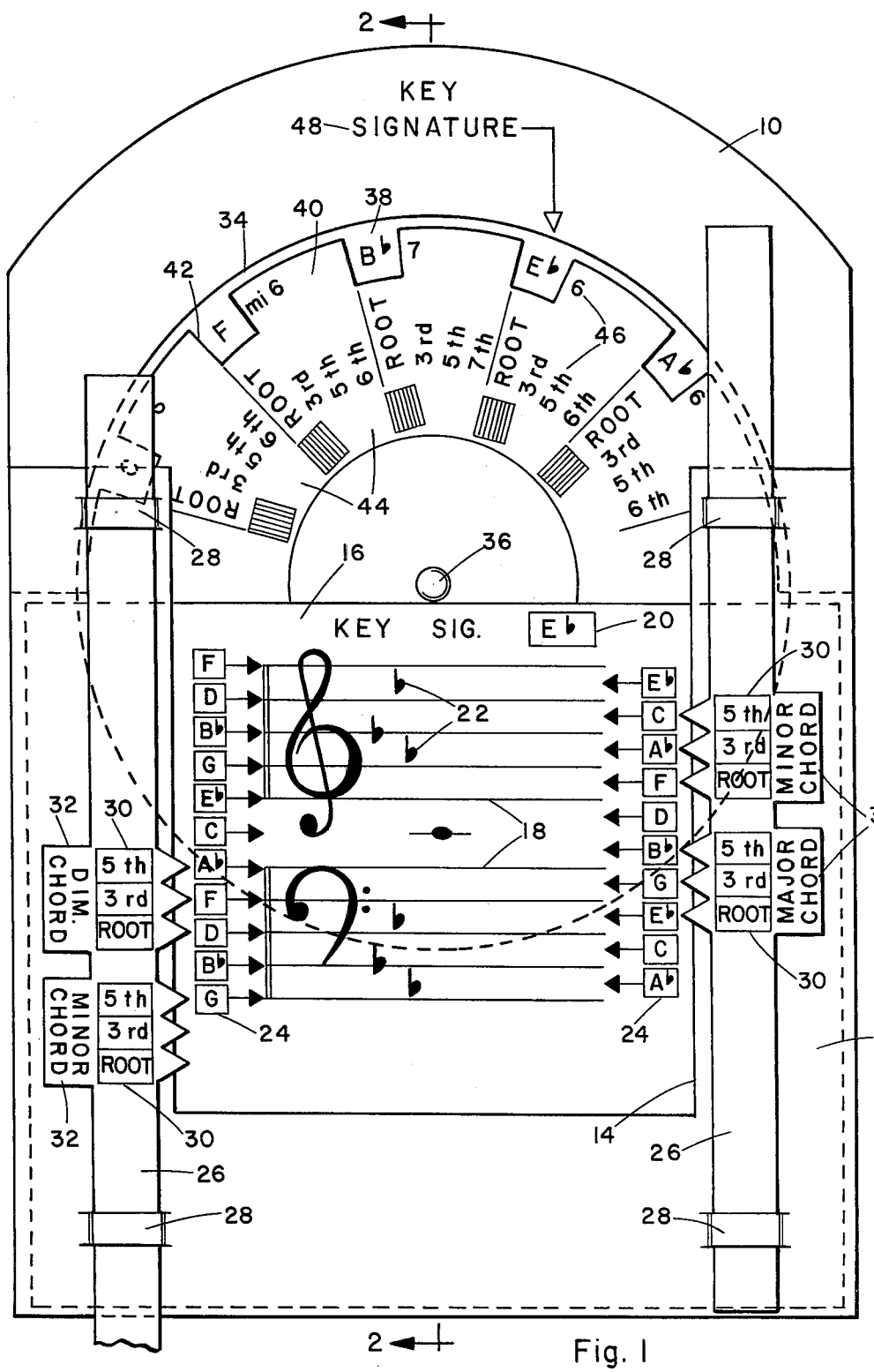
FIG. 1 is a front elevational view of the invention.
Figure 2:
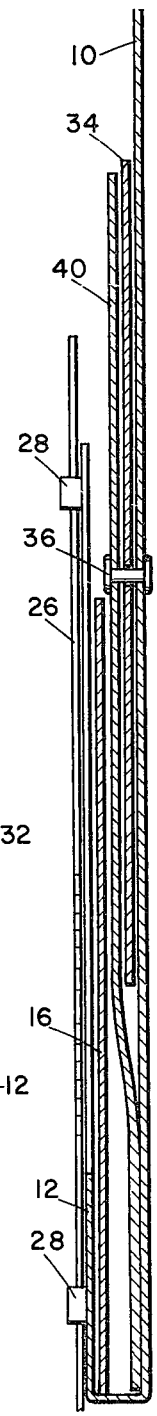
FIG. 2 is a vertical sectional view of the invention taken along line 2—2 of FIG. 1.
Figure 3:
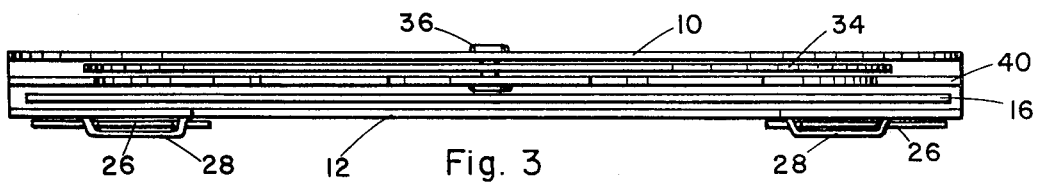
FIG. 3 is a top view of the invention looking down on the device as illustrated in FIG. 1.

The device comprises a planar backing panel 10 joined at its lower edge to an overlay sheet 12. The overlay sheet and the backing may be a single sheet of stiff paper or the like with a fold at the bottom, and the side edges may be joined together to define an envelope if desired.

The overlay sheet extends partially across the backing panel as shown and is provided with a large parallel-sided aperture 14 in the upper central portion thereof. Beneath the overlay sheet is a removable insert sheet 16 which displays a double staff 18 which is exposed through the aperture.

The insert sheet is one of a set of similar sheets, each of which is designed for use with a particular key signature which is identified as $E^b$ at 20 on the sheet illustrated. Sheets should be preferably provided to represent all the key signatures. The lines and spaces of the staffs representing flatted or sharped scale tones in the particular key signature are provided with the appropriate incidentals as at 22, and all the lines and spaces are named in a pair of laterally disposed rows 24. The direction in which the rows extend is termed "vertical" in the description and claims to simplify the explanation, although the term is not intended to limit the invention to an upright form, as it would normally be used on a horizontal writing surface. The scale tones names in the rows 24 which are sharped or flatted in the particular key signature are so indicated, the A, E, and B being flatted in the drawing.

On the overlay sheet adjacent each of the side edges of the aperture 14 is one of a pair of elongated vertical panels 26 which are slideably mounted to the overlay sheet by means of outstruck portions 28 which define sleeves for the panels. Each panel is provided with one or more groups of chord indicators 30 which indicate by juxtaposition with particular ones of the named scale tones 24 the composition of a certain chord whose type is identified as on the tab 32. The lower indicator on the right hand panel labelled "Major Chord," for example, can be aligned as shown such that the ROOT is adjacent the $E^b$ scale tone, and the arrow-like projections on the panel point out the three tones consituting the $E^b$ major chord. The diminished and minor chord indicators can be adjusted in a similar fashion to indicate the related minor chords in the key of $E^b$, as made clear hereinafter. If desired, the student can write the names of the scale tones on the arrow-like projections, or additional writing space may be provided for this purpose, although once the scale tones are inscribed the unit is limited to the related key signature.

Turning to the upper portion of the device, a circular dial 34 is pivotally mounted to the backing panel 10 by a rivet 36. The position of the dial should be such that a considerable part of the upper portion thereof is above the sheet 16 when the latter is fully inserted. Around the periphery of the dial is an evenly angularly spaced array of indicia 30 naming all 12 scale tones in order of the cycle of fourths. A cover sheet 40 which may be simply pasted to the lower portion of the backing panel extends upwardly to substantially cover the dial except for the spaced notches 42 which are spaced identically to the indicia 38 to expose same when the dial is properly positioned.

Each of the notches 42 is disposed in a marked-off sector 44 and each sector displays indicia 46 which name a particular chord type adjacent the notch, and the scale degrees of the scale tones of the chord named, such as ROOT, 3rd, 5th, 7th for the 7th chord. Instead of the scale degrees, the scale tones could be identified by tonal numbers (numbers representing location in the chromatic scale), or by intervals on the chromatic scale. Further indicia 48 on the backing panel selects the scale tone in the second notch from the right as the "Key signature." It should be noted that the indicia 46 and 48 could all be on the cover sheet 40, or all on the backing panel, the important feature being that the indicia remain stationery as the dial is rotated.

Although any conceiveable chord types could be named in the sectors 44, the particular chord sequence named in the illustrated embodiment is of considerable significance because they all relate to the key signature selected by the indicia 48. For example, when the dial is in the position shown, the $A^b$ 6th and $B^b$ 7th are the related major chords in the key of $E^B$, and F minor and C minor are the related minors. The cycle of fourths display on the dial is such that regardless of the key signature selected by adjustment of the dial, the related major and minor chords will appear in the notches at 42.

The proposed operation of the unit is as follows. First the user selects a key signature and inserts the insert sheet relating to that key signature as shown. The dial is rotated until the selected key signature is in the key signature notch, which causes the related major and minor chords to appear in the appropriate notches. The particular scale tones of the selected chord are found by adjusting one of the panels 27 until the root indicator aligns with the scale tone comprising the root. For example, in the illustration, if the F minor 6th chord is selected, either of the panels may be shifted until the ROOT indicator of the minor chord indicator group aligns with one of the F scale tones, and the other indicators in the group point out the other tones in the chord.

The device may be used in any key signature by replacing the insert sheet 16 with the appropriate sheet. The panels 26 are not limited to the two indicator groups shown thereon, but may be provided in any number representing any chord types or intervals desired with slight modification of the structure.

I claim:

1. A musical teaching aid comprising:
   a. an insert sheet identified with a particular key signature and displaying a musical staff having the lines and spaces thereof named according to the scale tones comprising said particular key signature, said named scale tones being displayed in a pair of evenly spaced vertical arrays disposed laterally of said staff;
   b. an overlay sheet disposed on said insert sheet and having an opening with parallel side edges to expose said staff and scale tone arrays;
   c. a pair of panels vertically slideably mounted on said overlay sheet adjacent the left and right side edges thereof respectively, each of said panels having at least one group of indicators to indicate by juxtaposition with one of said vertical arrays the particular ones of said named scale tones on said insert sheet which define a particular type of chord and naming said particular type of chord.

2. Structure according to claim 1 and including a backing panel connected to said overlay sheet at the bottom edge thereof;
   said backing panel having mounted thereon a rotatable dial having a display thereon of evenly angularly spaced scale tone names arranged according to the cycle of fifths; and further including a cover sheet mounted on said backing and extending over a substantial portion of said dial, said cover sheet having indicia thereon adjacent the periphery of said dial naming particular types of chords such that rotative adjustment of said dial juxtaposes individual ones of said angularly spaced scale tone indicia with said chord naming indicia to name particular chords.

3. Structure according to claim 2 wherein the upper edge of said cover sheet substantially conforms with the contour of the upper edge of said dial and has notches therein spaced to expose the scale tone names on said dial.

4. Structure according to claim 3 and including indicia on said backing panel identifying one of said notches as the key signature, and said chord-naming indicia naming a plurality of major and minor chords such that when the scale tone names of said dial are juxtaposed therewith said major and minor chords are the major and minor chords related to the key signature identified in said one of said notches.

* * * * *